United States Patent Office 3,166,431
Patented Jan. 19, 1965

3,166,431
CATALYST COMPOSITION
Arthur B. Mullaly, 2925 Park Blvd., P.O. Box 11,283,
Palo Alto, Calif.
No Drawing. Filed Mar. 28, 1962, Ser. No. 183,051
11 Claims. (Cl. 106—264)

The invention relates to catalytically active compositions.

Cobalt and manganese in form of certain organic salts and soaps are being used to a considerable extent to increase the rate of oxidation or polymerization of organic compounds. Such salts are employed as ingredients of drier compositions to assist in the formation of films from drying or semidrying oils or synthetic resins which contain unsaturated fatty acids. They are also used as "promoters" in polymerization and copolymerization reactions in the presence of peroxides or hydroperoxides, for instance in the curing of unsaturated polyesters in mixture with styrene, or as catalysts in storage-stable single package coating compositions based on "urethane oils" and polyester-diisocyanate reaction products, and in similar reactions.

In spite of their great activity, said cobalt or manganese soaps are far from being ideal catalysts for most of the recited applications because they have the great drawback that they are quite dark colored and transmit such coloring more or less to the films and coatings in which they have been incorporated. Therefore, many attempts have been made to replace the cobalt and manganese by metals forming less darkly colored or colorless soaps. These attempts were not entirely successful as the decrease of the powerful cobalt and manganese catalysts was generally accompanied by an increase of the time required for the drying, film-forming, or other desired catalytic action.

I have now found that samarium soaps can replace to a large extent the cobalt and manganese soaps in such a way that the same catalytic effect is maintained without undesirable coloration of the produced film. The samarium soaps have mostly a slightly yellow-greenish hue which apparently compensates the bluish or reddish color imparted by conventional drier soaps to a nearly white transparency in the cured films.

Over the colorless soaps of calcium, zirconium, and similar metals, samarium soaps have the advantage that they may also be considered, like other soaps of the rare earth metals, primary driers. However, they seem to be the only rare earth soaps which do not contribute color but are almost colorless or only very light colored. It is of particular interest that the samarium soaps which are useful as driers, crystallize in the same crystallographic system as the corresponding cobalt soaps.

When using samarium soaps, I have found that up to 85 percent of the normally used cobalt or manganese can be replaced by samarium. With amounts up to about 75 percent, essentially the same catalytic effect as to drying time and gel time are obtained as with 100% Co. Higher ratios of samarium will be used when obtaining pure whites is more important than reducing the length of the curing time.

Preferred soaps are the salts of straight or branched aliphatic acids having 6 to 24 C atoms, preferably 8 to 16 C atoms, and of naphthenic acid. Particularly useful acids are octoic acids, iso and normal decanoic acids, dodecanoic acids, tridecanoic acid, abietic acid, linolenic acid, tallic acid, "tall oil," and others, also the acetylacetonates; mixtures of salts of different acids may be used, and different cobalt and samarium salts may be present.

If the novel cobalt-samarium catalyst is used in drier compositions, such compositions may contain, of course, in addition any of the secondary driers such as lead, zinc, calcium, and the like. However, it is a particular advantage of the samarium soaps that they can replace completely the conventional lead driers.

When the catalyst mixture is used to replace the cobalt in the curing of polyester-diisocyanate resins, it is of advantage to apply it in combination with an organotin compound, for instance a dialkyl tin dilaurate or a similar organotin salt of a monocarboxylic or dicarboxylic aliphatic acid. Such organotins are used preferably in a proportion of 1 part of metallic tin to about 20 to 50 parts of metallic cobalt and samarium and stabilize the cobalt drier in its divalent form.

The catalyst composition may be added to the systems to be catalyzed as such or dissolved in a suitable solvent, such as benzene, toluene, xylene, monomeric styrene, high boiling aromatic thinners, petroleum thinners, mineral spirits boiling at 300 to 400° F., and the like.

The following examples are given to illustrate the invention:

Example 1

A white enamel containing 20% of a linseed oil modified medium oil length oleoresinous alkyd resin and 25% of a mixture of titanium dioxide and zinc oxide pigment, the balance being mineral spirits, was applied with 0.4% Co in form of a 6% cobalt naphthenate solution and 0.3% Pb in form of a 24% lead naphthenate solution. A dry to touch coating was obtained within 2.5 hours.

In a comparative test, there was used as drier 0.05% Co as 6% cobalt naphthenate solution
0.3% Sm as 6% samarium isodecanoate solution
0.05% Ca as 4% calcium naphthenate solution Within the same drying time, a superior final dry with less loss of gloss on exposure to sun and weather was obtained, and the film showed far less after-yellowing than the film prepared with the Co-Pb drier.

Example 2

To 100 parts of a one-package resin mix sold in commerce under the trade name Tranco 160B, there were added 0.02% Mn, 0.015% Co, 0.2% Sm, 0.05% Ca, and 0.02% dibutyltin in form of their isodecanoates as a solution in mineral spirits containing about 6% of total metal.

When such mix was brushed on glass at room temperature, the cotton free dry time of the film was 55 minutes, the touch dry time 70 minutes, and the dry through time 4 hours. The color of the film was a very pale rose.

Tranco 160B is a product of the Trancoa Chemical Corporation and prepared by heating a drying oil such as soybean oil with a polyol such as pentaerythritol in the presence of a catalyst such as litharge to about 440° F. until ester interchange takes place. The cooled product is then reacted with tolylene diisocyanate at a temperature of 160 to 220° F.

Example 3

A polyester resin was prepared from the following components:

| | |
|---|---|
| Isophthalic acid, 1 mole⎫ | |
| Propylene glycol, 2.2 moles⎬ | 70 parts |
| Fumaric acid, ½ mole⎪ | |
| Maleic acid, ½ mole⎭ | |
| Styrene monomer | 30 parts |
| Methyl ethyl ketone peroxide (60% soln. in dimethyl phthalate) | 2 parts |
| Cobalt naphthenate (6% Co) | 1 part |

At a temperature of 75° F., the gel time was 20 min. The color of the obtained plastic rod was bluish red. If the cobalt naphthenate was replaced by the same amount of catalyst containing 85% of Sm and only 15% of Co, the gel time was slightly increased to 35 min., but the color was almost water white being a very pale rose. When the Co content was reduced to 0.1% and 0.05% Sn were added in form of dibutyltin diisodecanoate, the Sm content remaining 0.85%, the cure at room temperature was terminated after about 50 minutes, the gel time was about 30 minutes, and the color was almost water white.

*Example 4*

2.2 moles of a polyethylene glycol (av. mol. 200) were esterified after addition of 0.015 part of hydroquinone (based on the weight of the batch) with 1.5 moles of fumaric acid and 0.5 mole of tetrahydrophthalic anhydride, for a period of 6 hours under a nitrogen blanket at a temperature of 170 to 195° C.

70 parts of the obtained unsaturated polyester were mixed with 30 parts of styrene, and 0.005 part of hydroquinone were added to the mixture, which was cooled quickly to 25–30° C.

To the mixture, there were added 1.5% of methyl ethyl ketone peroxide in form of a 60% solution and 0.021% cobalt in form of a 6% cobalt naphthenate solution, and a film was prepared which was completely cured at 25° C. after 12 hours and had excellent mar resistance. The film had a pale blush color.

If films of the same composition were prepared where instead of 0.021% Co, only 0.006% Co and 0.015% Sm were used, the films retained their good mar resistance and presented, in addition, a very pale almost water white color.

*Example 5*

To a mixture of 6 parts of heat treated soybean oil and 2.5 parts of heat bodied oil, there was added cobalt acetylacetonate in an amount corresponding to 0.02 percent, calculated on metal. A coating prepared by flowing a small amount of the mixture on a glass panel required a drying time of about 5 hours and produced an amber film.

If the drier was replaced by the same amount of a mixture of 85% by weight of samarium acetylacetonate and 15% by weight of cobalt acetylacetonate, the drying time was 5½ hours and the film had a better overall color.

*Example 6*

0.01% of cobalt, in the form of a 6% cobalt octoate solution in mineral spirits, were added to a lacquer composition comprising 3.5 parts of an alkyd resin and 1.5 parts of linseed oil. The drying time was 4 hours.

If instead of 0.01% cobalt the same metal amount was added as a mixture of 75% Sm octoate and 25% cobalt octate, the drying time was also 4 hours, but the color was much lighter, in the wet film as well as in the dried film.

*Example 7*

A mixture of 30 parts of a polyester (prepared from phthalic acid, maleic anhydride, fumaric acid, and polypropylene glycol, acid number 45–50), 5 parts of styrene, and ½ part of cyclohexanone peroxide gelled within 30 minutes when cobalt isodecanoate corresponding to 0.01% metal was added. The color of the gel was a pale but distinct blue.

If, instead of the cobalt isodecanoate alone, a mixture thereof with samarium isodecanoate in the ratio $$Co:Sm = 1:4$$

was used, the polyester-styrene product gelled within 50 minutes to a nearly water white gel.

I claim:

1. As a new catalyst composition, a mixture of organic salts of at least two metals, the organic moiety of said salts being selected from the group consisting of acetylacetone, aliphatic acids having 6 to 24 C atoms, and naphthenic acid, one of said metals being selected from the group consisting of cobalt, manganese, and mixtures thereof, the other metal being samarium in an amount of 5 to 85 percent of the combined metal content.

2. The composition as claimed in claim 1 wherein the organic moiety of all metal salts is the same.

3. The composition as claimed in claim 1 wherein the organic moieties of the different metal salts are different.

4. The composition of claim 1, containing, in addition, a diorganotin salt of an aliphatic carboxylic acid.

5. A liquid organic composition containing a film-forming air-drying oil composition and as catalyst the composition of claim 1.

6. The composition as claimed in claim 5 wherein said drying oil composition contains a substituent selected from the group of drying and semi-drying oil fatty acid radicals.

7. A polymerizable resin composition containing as polymerization catalyst the composition of claim 1.

8. The composition as claimed in claim 7 wherein said resin is an unsaturated polyester-styrene resin.

9. The composition as claimed in claim 7 wherein said resin is a polyurethane.

10. In peroxide catalyzed organic polymerization reactions, in which the peroxide catalyst is activated by cobalt in form of its organic salts, the improvement which consists in employing a composition as claimed in claim 1 as activator.

11. The process as claimed in claim 10 wherein the components of said activating composition are added separately.

References Cited by the Examiner

UNITED STATES PATENTS 2,251,798  8/41  Meidert et al. _____ 106—310

OTHER REFERENCES

Chemical Abstracts, "Spectrophotometric Investigation of Compounds of Samarium and Citric Acid," 1959, vol. 53, pages 15, 756.

MORRIS LIEBMAN, *Primary Examiner.*

ALEXANDER H. BRODMERKEL, *Examiner.*